March 15, 1949.  S. H. SACKER  2,464,722
COFFEE MAKER
Filed March 3, 1947  2 Sheets-Sheet 1
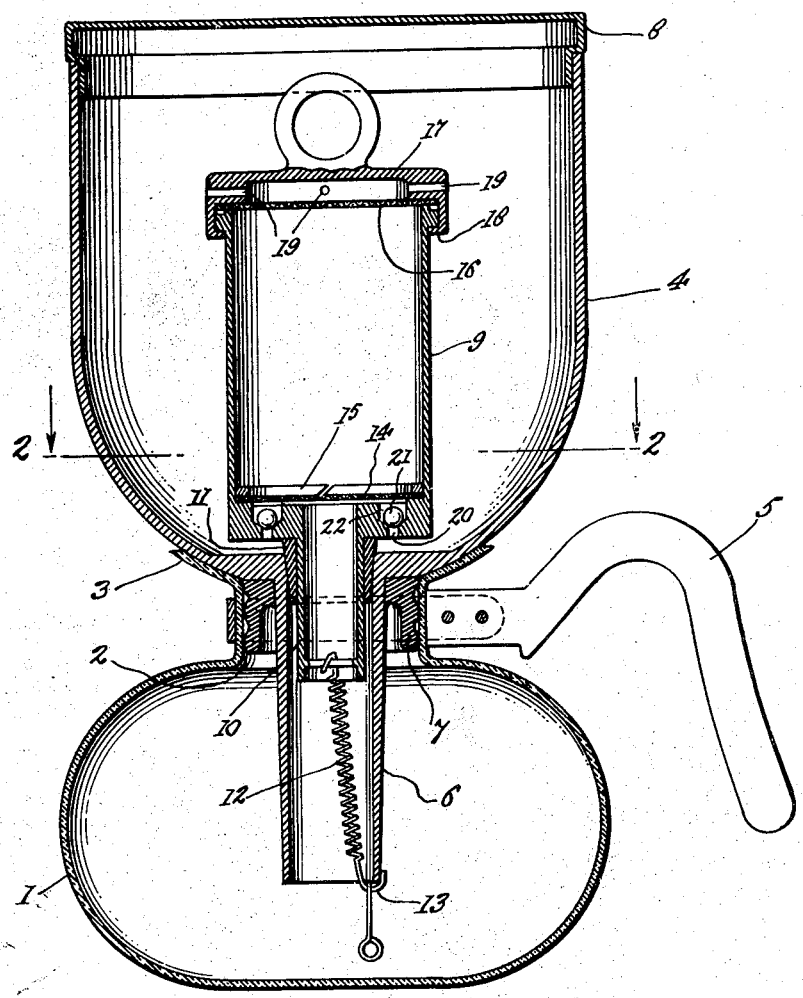
Fig. 1.
Fig. 2.
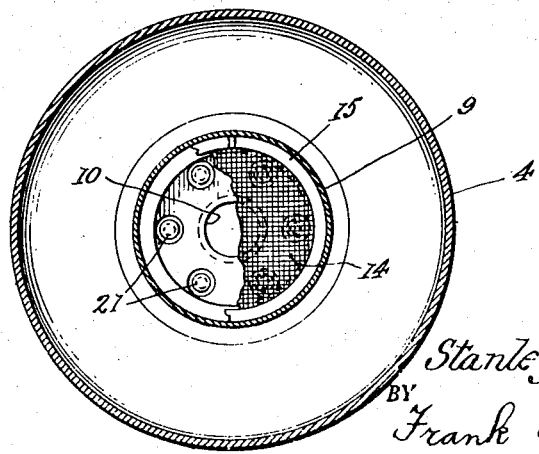
INVENTOR.
Stanley H. Sacker
BY Frank C. Maley
Agent March 15, 1949. S. H. SACKER 2,464,722
COFFEE MAKER
Filed March 3, 1947 2 Sheets-Sheet 2
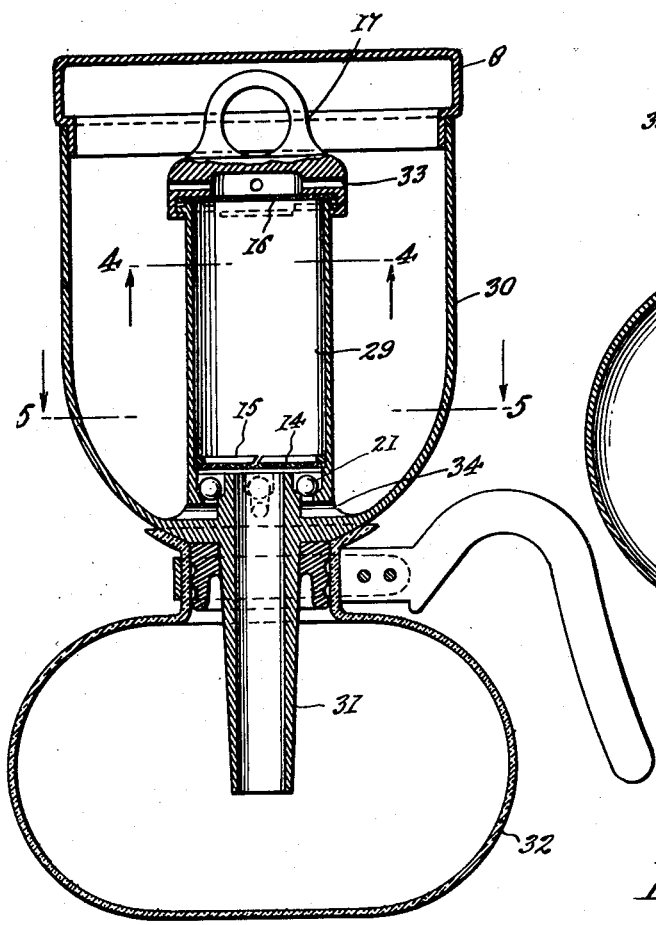
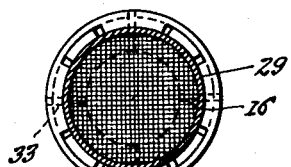
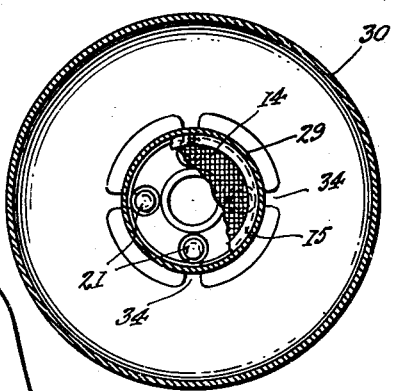
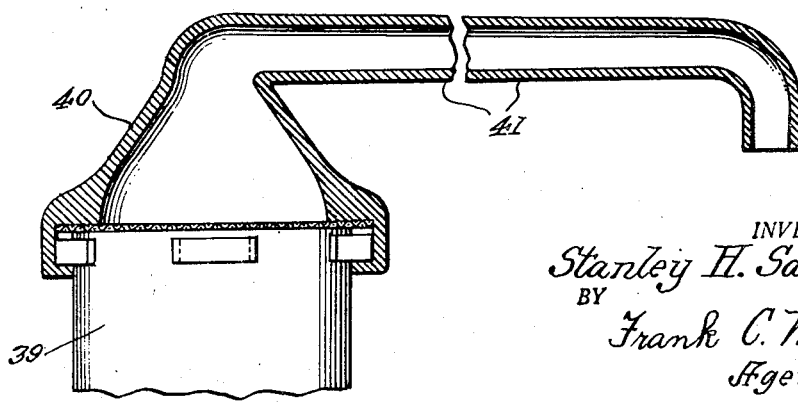
INVENTOR.
Stanley H. Sacker
BY
Frank C. Maley
Agent Patented Mar. 15, 1949

2,464,722

UNITED STATES PATENT OFFICE 2,464,722

COFFEE MAKER

Stanley H. Sacker, New Orleans, La.

Application March 3, 1947, Serial No. 731,895

9 Claims. (Cl. 99—292)

1

This invention relates to improvements in coffee makers, of the character used for brewing coffee in which separate vessels are used for containing the ground coffee and the water, and the latter is forced thru the coffee by pressure generated in the lower water receptacle.

The method used heretofore for brewing coffee by this type of vacuum coffee maker has involved the forcing of heated water up from the bottom receptacle into the top receptacle where the ground coffee is loosely contained, and then when the heat is discontinued, the water is forced down again by atmospheric pressure into the bottom receptacle. This method has caused the essential oils of the coffee to be filtered out by the grounds to a very substantial extent as the water is passed down into the lower container, and since such oils are not carried in any substantial amount to the lower container, the essence of flavor and aroma in the resulting brew is reduced appreciably in such treatment.

An object of this invention is to improve the method of brewing coffee by this type of pressure coffee maker, so as to return substantially all of the oil and aroma to the lower receptacle or bowl without filtering out of the essential oils during the return action.

A further object of the invention is to improve the construction of the coffee maker, whereby a brewing action may be accomplished without a filtering out of the essential flavor and aroma from the brewed coffee, in a construction which is practical and efficient for the purpose and for manufacture.

These objects may be accomplished by forcing the water under pressure from the bottom bowl or receptacle into the upper receptacle for the coffee and up through the latter in one direction only, whereby the water will displace, attract and absorb the essential oils of the ground coffee, and will pass back to the bottom receptacle without returning through the coffee grounds. A separate container for the coffee is placed preferably in the top receptacle or container with provision for circulation of the water therethrough in one direction only, and so constructed as to return the water with the absorbed coffee oils to the bottom or other bowl without passage through the ground coffee.

The invention is illustrated in certain embodiments in the accompanying drawings in which:

Fig. 1 is a vertical sectional view through a coffee maker, embodying this invention;

Fig. 2 is a cross section therethrough on the line 2—2 of Fig. 1;

Fig. 3 is a view similar to Fig. 1, but showing a modification with the coffee container integral with the top bowl or receptacle;

Fig. 4 is a detail cross section through the coffee container on the line 4—4 of Fig. 3;

2

Fig. 5 is a similar view through the coffee maker on the line 5—5 of Fig. 3; and Fig. 6 is a detail vertical section partly in elevation showing an alternative discharge formation.

Referring to Figs. 1 and 2, the invention is shown as applied to a coffee maker generally of conventional form in which the lower bowl or receptacle for the water is designated generally by the numeral 1, and is provided with a neck 2 with an upstanding flaring mouth 3, upon which is seated the top receptacle or bowl 4. These customarily are of glass, although the top bowl 4 frequently is of other material. A handle 5 is attached to the neck 2 for manipulation or handling.

The top bowl or receptacle 4 is provided with a depending tube 6, which extends downwardly therefrom into the lower bowl 1, and is surrounded by a sealing ring 7 which seals the space between the tube 6 and the inner diameter of the neck 2, to provide for building up a pressure in the lower bowl 1, when the water therein is heated in the usual manner. A top cover is shown at 8 on the receptacle 4, which may be omitted, however, if desired.

Mounted in the top receptacle 4 is a coffee container 9, constructed of a size to contain the desired quantity of coffee and having a depending tube 10, extending downwardly, telescoped into the tube 6 in the form shown. A gasket 11 seals off the space between the tubes 6 and 10. A coiled spring 12 is attached to the lower end of the tube 10 and provided with a hook 13 at the lower end thereof for detachably engaging the lower edge of the tube 6.

The container 9 has a screen or filter 14 extending over the upper end of the tube 10 and held in place by a spring ring 15. A similar screen or filter is shown at 16, covering the top of the container 9 and is held in place by a cap 17, which is detachably connected with the upper end of the container 9, as by interengaging connections or a bayonet joint, generally indicated at 18.

The container 9 should be of a suitable size to contain the desired quantity of loose or coffee in porous packages, between the screens 14 and 16. Upon removal of the cap 17 and the screen 16, the coffee may be introduced into the container and then retained therein upon replacement of these parts.

The cap 17 is provided with a plurality of radial portages or orifices 19 therein, above the screen 16 for discharge of the brewed coffee therefrom after the water has passed upward through the container and the coffee therein.

The bottom portion of the container 9 has a plurality of orifices 20 covered by ball check valves 21, that seat in a downward direction, and which orifices extend through the bottom of the container to a space 22, that is provided beneath the screen 14 and, therefore, beneath and spaced from the ground coffee in the container.

Therefore, as the temperature of the water in receptacle 1 is raised and a sufficient pressure built up in this bowl, pressure will hold the check valves closed, and the water will be forced up through the tubes 6 and 10, through the screen 14, the ground coffee in the container 9 and out through the screen 16 and orifices 19, into the top receptacle or bowl 4. Then, when the heat has been discontinued and the pressure is reduced in the container or bowl 1, a sufficient difference in pressure will be developed between the two receptacles as to cause the water to be passed out of the upper receptacle in the following manner:

The brew will flow upward through the orifices 20 raising the check valves 21, through the passageway 22, beneath the screen 14 and down through the tubes 10 and 6, into the bottom bowl.

In other words, the assemblage has its general regimen of operation along lines similar to those of the prior art assemblies, but varies therefrom in certain details, as will be indicated by the following:

The lower bowl 1, having a capacity for a considerable number of cups of liquid, twenty or more, is filled with the water, and the coffee charge placed in the container therefor, container 9 herein. In the present invention, the assemblage may be provided by preparing the coffee container within bowl 4 prior to positioning the latter with its tube 6 within the filled bowl 1. As usual, the heat application is such as to gradually bring the water in bowl 1 to a boil within a reasonable period, but not to the extent of developing steam. During the development of the boiling state, there is a pressure development within the bowl, since the outlet is closed by the filter 13 and the coffee charge thereabove, this pressure increasing until it is sufficient to force the boiling water to escape through the filter and into and through the coffee charge; the time of escape is indicated when the water begins to pass out of bowl 1 through tube 6, and since the decreasing content of water provides for more rapid development in the boil and pressure-developing action, the assemblage is then taken from the heating position, and permitted to stand, thus leaving the pressure active, but ending further pressure development. Hence, the pressure lowers as the water is discharged through the tube, the arrangement generally being such that the water level will be lowered slightly below the lower open end of the tube 6, after which the pressure rapidly spends itself directly within the tube in raising the previous water to and through the coffee charge.

In Figures 1 and 3 of the present invention, the brewed coffee formed by the water passed through the coffee charge is discharged into the upper bowl through the portage or orifices carried by the cap 17. The brewed coffee accumulates in bowl 4 as long as the pressure in bowl 1 is superior. However, when the pressure in bowl 1 becomes lowered to a point where the weight of the content of bowl 4 and the pressure value on the surface of such content becomes superior, balls 21 will be unseated to open ports 20 permitting the contents of bowl 4 to pass into the channel 22 and flow downward through tube 6 to the lower bowl.

The passageway of the heated water up through the immobile coffee in the container 9, in one direction, has caused it to displace and emulsify the essential oils from the coffee without having these filtered out by the return movement of the brewed coffee through the "grounds" contained therein.

The container 9 is shown as separable from the top bowl or receptacle 4 and may be removed readily therefrom upon detachment of the hook 13. It may be desirable to separate the parts for cleaning, after which the container may be replaced ready for use.

A modification is shown in Fig. 3, in which the container 29 is integral with the top bowl 30, formed in one integral piece therewith, as well as with the depending tube 31 that extends downwardly in the lower bowl 32. The construction of the container 29 otherwise is the same as that illustrated in Fig. 1, and described above.

Referring to Figs. 3 to 5, the coffee is placed in the container 29, as described above, between the screens at opposite ends thereof, while the water is placed in the lower bowl 32. Upon heating of the water and the building up of sufficient pressure in the lower bowl, this is forced up through the tube 31, upwardly through the container 29, and out through the orifices 33 into the upper bowl 30. Then when the pressure is reduced in the lower bowl 32, the water is returned thereto with the absorbed coffee oils, through the passageways 34 for return through the tube 31, without passing back through the coffee grounds in the container 29.

If desired, the brewed coffee may be drawn directly from the container, as shown in Fig. 6. In this form, the container 39 for the coffee has a cap 40, detachably mounted thereon, as described above. A spout 41 extends laterally from the cap 40 and is attached thereto. Therefore, as the coffee passes upward through the container 39, the pressure in the bottom bowl will cause it to pass off through the spout 41, into a suitable receptacle, cup or otherwise.

The present arrangement, while described for use in brewing or distilling coffee, can be utilized in distilling or brewing flavors and essences, such as onion, peach leaves, catnip, garlic, greentea, berry and other fruit flavors, broth and vitamins from meats, vegetables etc.

While the invention has been illustrated and described in certain embodiments, it is recognized that variations and changes may be made therein, without departing from the invention, except as specified in the claims.

I claim:

1. A coffee maker comprising a water receptacle, a second receptacle mounted on the water receptacle and having a depending tube extending into the water receptacle, a container mounted in the second receptacle, said container having an opening in the bottom thereof in communication with the tube, a detachable cap secured on the top of the container and having orifices therein for discharge of the water after passing upward through the container and through the cap orifices into the second receptacle, and a passageway having a check valve therein extending from the second receptacle to the bottom opening of the container to return the water from the second receptacle into the tube without passing through the container.

2. A coffee maker comprising a water receptacle, a second receptacle mounted on the water receptacle and having a depending tube extending into the water receptacle, a container mounted in the second receptacle, said container having an opening in the bottom thereof in communication with the tube, a detachable cap secured on the top of the container and having orifices therein for discharge of the water after passing upward through the container and through the cap orifices into the second receptacle, and a passageway having a check valve therein extending from the second receptacle to the bottom opening of the container to return the water from the second receptacle into the tube without passing through the container, said container having a depending tube telescoped into the first-mentioned tube and in sealing relation therewith, said container tube surrounding the opening in the bottom of the container.

3. A coffee maker comprising a water receptacle, a second receptacle mounted on the water receptacle and having a depending tube extending into the water receptacle, a container mounted in the second receptacle, said container having an opening in the bottom thereof in communication with the tube, a detachable cap secured on the top of the container and having orifices therein for discharge of the water after passing upward through the container and through the cap orifices into the second receptacle, and a passageway having a check valve therein extending from the second receptacle to the bottom opening of the container to return the water from the second receptacle into the tube without passing through the container, said container being formed in one integral piece with the second receptacle.

4. A brewing device comprising a water receptacle, a second receptacle mounted on the water receptacle and having a depending tube extending into the water receptacle, a container mounted in the second receptacle, said container having an opening in the bottom thereof in communication with the tube, a detachable cap secured on the top of the container and having orifices therein for discharge of the water after passing upward through the container, and into the second receptacle, and a passageway having a check valve therein extending from the second receptacle to the bottom opening of the container to return the water from the second receptacle into the tube without passing through the container.

5. In coffee making assemblages, wherein the water and coffee charge are carried separately in the same assemblage and rendered coactive for coffee brewing by water heating and delivery of the boiling water to the charge in regulated volume for beverage brewing, and wherein the delivery of the boiling water is by pressure developed within the water containing receptacle by and during water heating development, an assemblage of such type comprising a lower water heating receptacle, an upper receptacle removably supported by the first receptacle and having controlled communication therewith, said second receptacle having a removable top closure and also having a tubular member extending downwardly therefrom with its lower end open and located in spaced relation to the bottom of the first receptacle, said controlled communication comprising a check-valve controlled passageway extending from the upper receptacle toward and in open communication with the upper end of the tubular member to thereby permit movement of the brewed coffee from the upper receptacle to the lower receptacle when pressure in the latter is of inferior value to pressures within the upper receptacle, and a coffe charge carrying unit removably supported within the upper receptacle, said unit including a coffee-charge chamber above and axially alined with the upper end of the tubular member and in communication with such member, a removable filter element overlying the upper end of the tubular member and forming a bottom for the charge chamber, a second filter element at the top of the charge chamber, and interchangeable formations adapted for individual service and removably secured to the top of the chamber walls in overlying relation to the second filter element, each interchangeable formation having portage means effective above the second filter element for discharging the brewed coffee beyond the charge chamber walls to thereby limit water passage through the coffee charge to movement in an upward direction.

6. An assemblage as in claim 5 characterized in that the check-valve control is in the form of a ball element mounted in the passageway and normally seated therein in presence of superior pressure values within the lower receptacle with the elements unseated by pressures developed within the upper receptacle when dominant.

7. An assemblage as in claim 5 characterized in that the coffee-charge carrying unit is separable from the upper receptacle and is formed with a bottom having an axial opening and having a downwardly extending tubular extension adapted to extend into and be axially-alined with the tubular member of the upper receptacle, the first filter element being supported above the top plane of such unit bottom and in spaced relation to the upper end of such axial opening, said space providing a portion of the controlled communication between the upper and lower receptacles when the unit is in service position.

8. An assemblage as in claim 5 characterized in that the bottom zone of the unit is formed integral with the bottom zone of the upper receptacle, with the upper end of the tubular member exending above the bottom zone of the upper receptacle and with its upper open end spaced below the first filter element, said space providing a portion of the controlled communication between the upper and lower receptacles when the unit is in service.

9. An assemblage as in claim 8 characterized in that the space is connected with the interior of the upper receptacle by portage controlled normally-seated check-valves adapted to be unseated by differential in pressure values between the upper and lower receptacles.

STANLEY H. SACKER.

REFERENCES CITED

The following references are of record in the file of this patent:

UNITED STATES PATENTS

| Number | Name | Date |
| --- | --- | --- |
| 150,263 | St. John et al. | Apr. 28, 1874 |
| 378,296 | Ehrlich | Feb. 21, 1888 |
| 865,776 | Georg | Sept. 10, 1907 |
| 951,626 | Bachelder | Mar. 8, 1910 |
| 1,774,927 | Lambert | Sept. 2, 1930 |

FOREIGN PATENTS

| Number | Country | Date |
| --- | --- | --- |
| 11,583 | Great Britain | A. D. 1847 |